Sept. 21, 1971 R. A. JOHNSON 3,606,743
PICKING HEAD FOR CORN HARVESTING MACHINE
Filed Dec. 11, 1969 6 Sheets-Sheet 6

United States Patent Office 3,606,743
Patented Sept. 21, 1971

3,606,743
PICKING HEAD FOR CORN HARVESTING
MACHINE
Robert A. Johnson, Rossville, Ill., assignor to FMC
Corporation, San Jose, Calif.
Filed Dec. 11, 1969, Ser. No. 884,101
Int. Cl. A01d 45/02
U.S. Cl. 56—14.2
13 Claims

ABSTRACT OF THE DISCLOSURE

A pair of vertically spaced endless driven belts are provided at each side of the picking head of a corn harvesting machine. The upper or gathering belts have confronting flights of closely spaced slats which form walls straddling the cornstalks. The lower or butt stop belts are formed of bent slats that slope inward to cooperatively form a ledge or butt stop for arresting downward movement of the ears to be stripped from the stalk. A power driven cutter blade for trimming the butt ends of the ears is mounted between the upper and lower pairs of gathering and butt stop belts in the path of the lower ends of the upright ears. Downstream of the butt trimming blade, each ear strikes a fixed abutment which orients the trimmed ear to be discharged from the machine tassle-end first.

CROSS REFERENCES TO RELATED APPLICATIONS

The present disclosure includes environmental structure which is the subject matter of the pending patent application of Looker, Ser. No. 675,467, now Pat. 3,499,272, assigned to the same assignee as the present invention.

BACKGROUND OF THE INVENTION

Field of the invention

The present invention is directed to mobile harvesting machines, and more particularly to a corn harvesting machine of the type which straddles a row of cornstalks and operates by pulling the cornstalks downward, while the ears are restrained, to strip the ears from the stalks.

Description of the prior art

The above identified Looker patent application discloses a machine for harvesting green or table corn, in contrast to corn harvesting machines which harvest feed corn for livestock, and to that end features structure which gently handles the ears to prevent their being damaged. Before the table corn is distributed, the butt or stalk ends of the ears are usually trimmed, and this trimming operation has heretofore been carried out by apparatus in the packing shed. Since the ears must be oriented and handled again for trimming before packing, this time and labor would be unnecessary if the ears could be trimmed during the harvesting operation.

SUMMARY OF THE INVENTION

The present invention concerns a self-propelled corn harvesting machine and more particularly is directed to an improved picking head which includes means for trimming the butt ends of the ears. The picking head positions the ears with a common orientation and elevation therein, and then conveys the ears past a trimming knife which severs a predetermined portion from the ears. The ears are then reoriented to be discharged from the machine tassle-end first to facilitate further handling. An incidental advantage of field trimming is that the trimmed waste can be left in the field.

DESCRIPTION OF THE PREFERRED EMBODIMENT

The harvesting machine 20 (FIG. 1) includes a frame 21 supported by steerable rear wheels 22 and driven by powered front wheels 23. A driver at a control station 24 manipulates hydraulic controls at a console 25 which govern various power mechanisms, later mentioned, that derive hydraulic power from a main pump 26 (FIG. 4) driven by an engine in a housing E.

Figure 4:
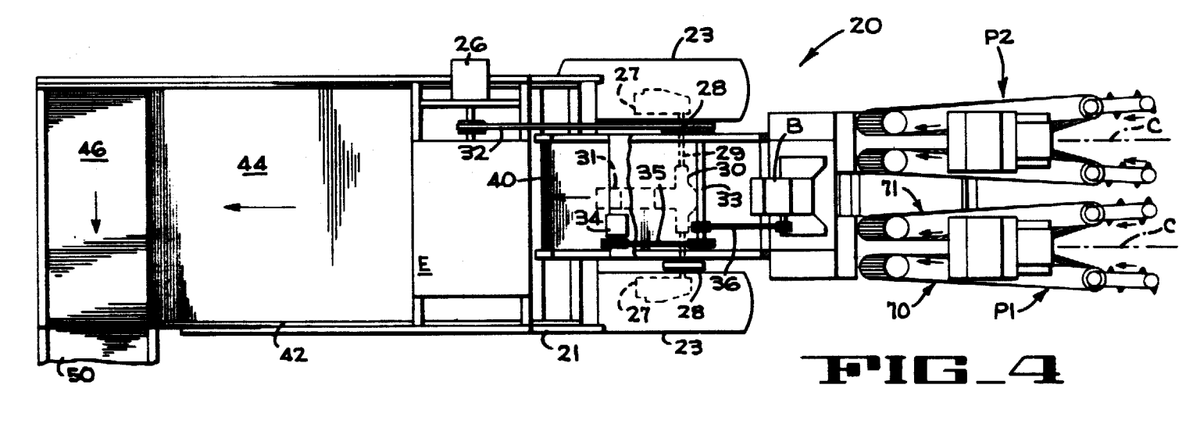
FIG. 4 is a diagrammatic plan, partly broken away, of the harvesting machine shown in FIG. 3.

As shown diagrammatically in FIG. 4, the wheels 23 each have a gear reduction hub 27 which is coupled, through a brake 28, by an axle 29 to a differential unit 30. A hydraulic motor and transmission assembly 31 is mechanically coupled to the differential, and is hydraulically connected to controls at the console 25. The hydraulic motor which drives the transmission is powered by a V-belt and pulley unit 32 which is connected to the engine and to a jackshaft 33. Extending across the harvesting machine, the jackshaft drives a hydraulic pump 34, for the hydraulic motor of the transmission assembly 31, by a V-belt and pulley unit 35. The jackshaft also transmits power by a V-belt 36 to a centrifugal blower B that has discharge ducts 37. Air blasts from the ducts 37 blow leaves and other debris lighter than the harvested ears onto the ground.

Figure 3:
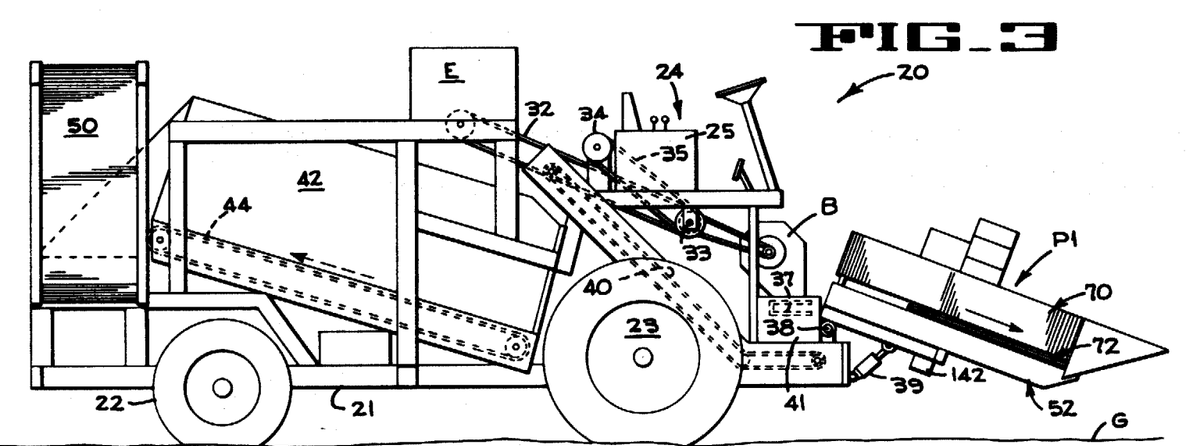
FIG. 3 is a diagrammatic side elevation of the overall harvesting machine, similar to FIG. 1, but in an operative, harvesting condition.
Figure 8:
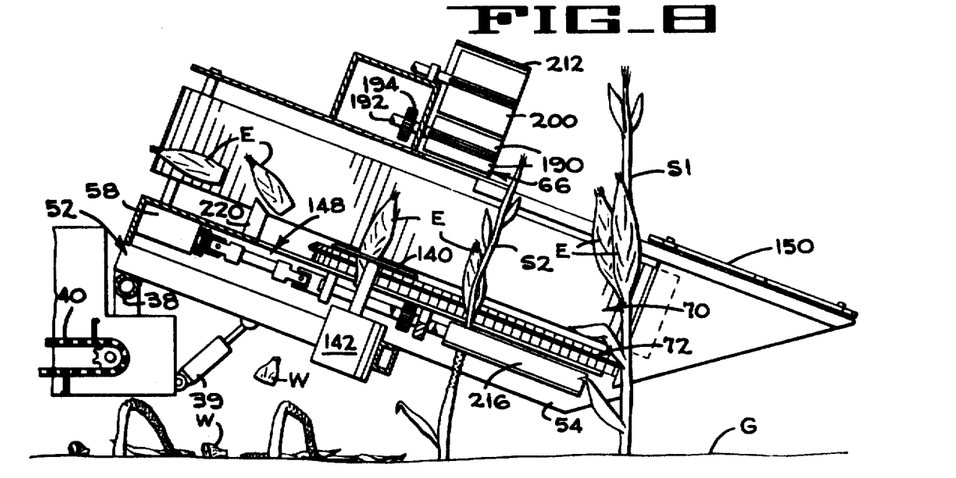
FIG. 8 is a diagrammatic section of a picking head in operation to show the overall harvesting mode.

Mounted on the leading end of the harvesting machine 20 (FIG. 1) are laterally spaced picking heads P1 and P2, each head being arranged to straddle a row of cornstalks that lie along the centerlines C (FIG. 4). The picking heads can be simultaneously pivoted upward, to the position shown in FIG. 3, about a common horizontal pivot axis at 38, by energizing a double-acting hydraulic cylinder 39 and an identical cylinder, not shown, at the other side of the machine. For regulating the elevational position of the picking heads, the piston rods of the cylinders 39 may be locked in intermediate positions to selectively position the height of the free ends of the picking heads from the ground line G (FIG. 8) when the harvesting machine is in operation. For transporting the machine to and from a cornfield, the picking heads are elevated, and in a harvesting operation the picking heads are adjusted to a position about as shown in FIG. 3. The subject matter of the present invention is particularly directed to the picking heads P1 and P2, as will be later described in detail.

Figure 1:
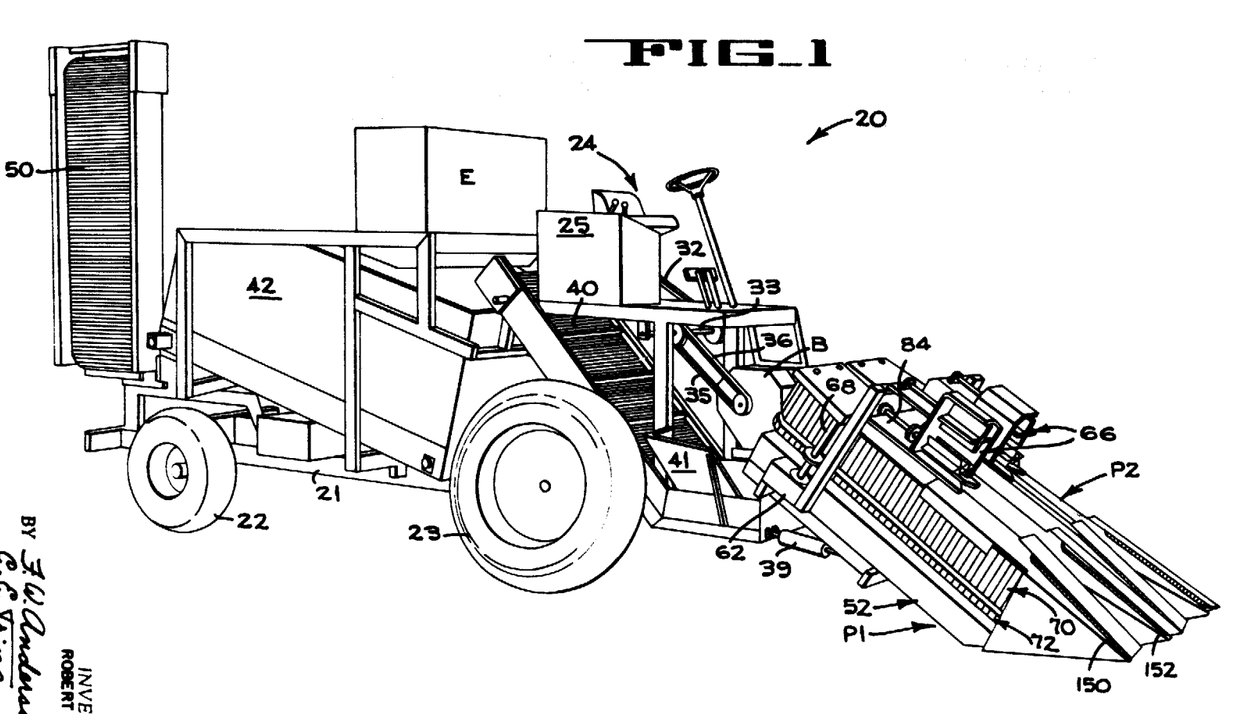
FIG. 1 is a perspective of the corn harvesting machine with its leading end picking heads and a trailing end discharge conveyor in non-operative parking positions.
Figure 2:
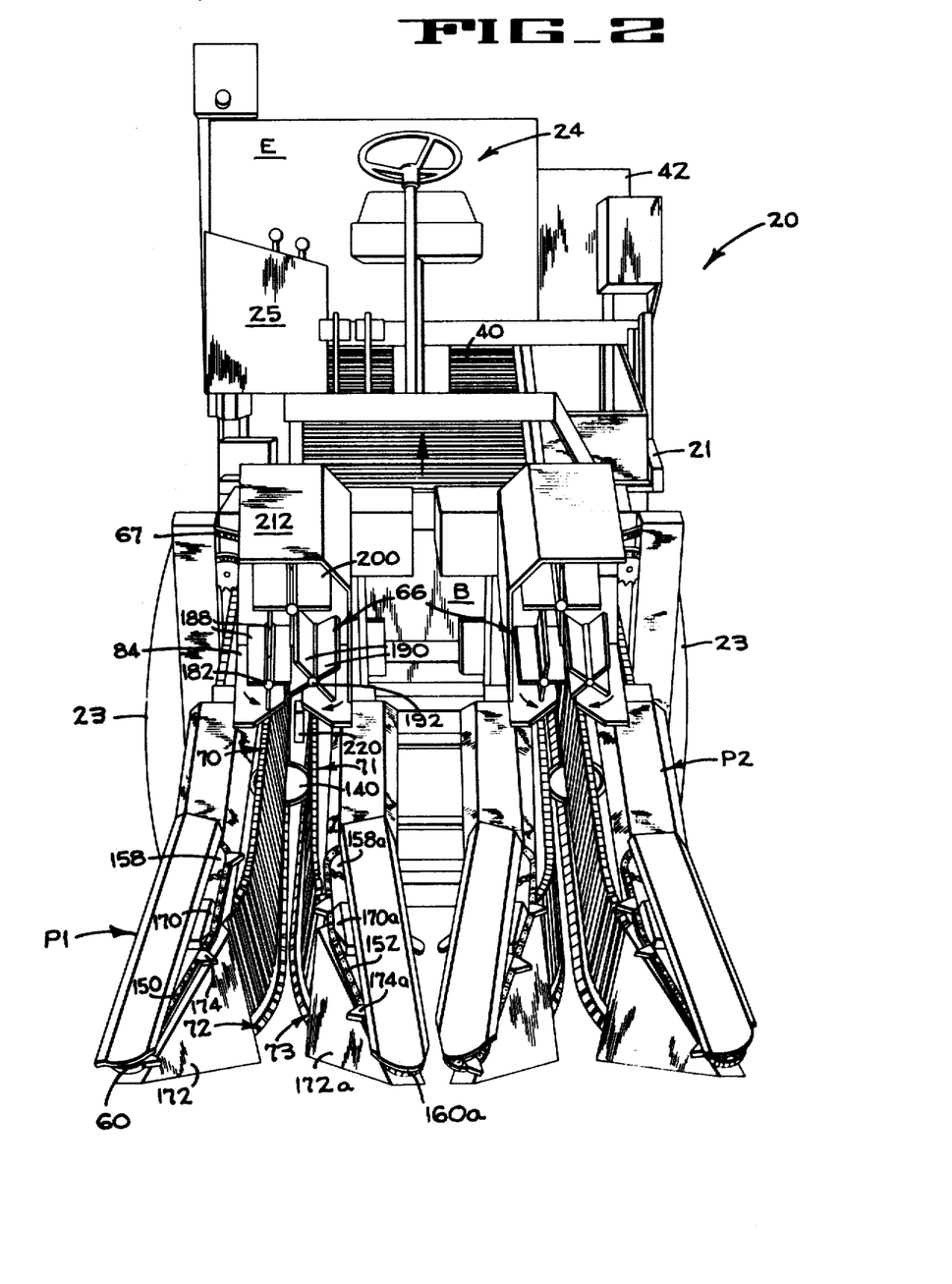
FIG. 2 is a frontal perspective of the harvesting machine shown in FIG. 1.

Continuing with reference to FIGS. 1–3 and the general description of the harvesting machine 20, the picking heads P1 and P2 function to pull the cornstalks downward onto the ground, while their ears E are severed from the stalks and conveyed rearwardly within the picking heads. The harvested ears are discharged onto the level inlet end of an elevator conveyor 40 (FIG. 3). Inclined guide panels 41 at each side of the inlet end of the elevator conveyor are impinged by air blasts from the blower ducts 37 so that loose foliage and all other material lighter than the ears is blown up and over the panels onto the ground. Extending a short distance rearwardly, and then upwardly under the control station 24, the elevator conveyor 40 discharges the ears into an open-bottom and open-end hopper 42.

The bottom of the hopper comprises an endless slat-type conveyor 44 that discharges the ears onto a cross conveyor 46 which delivers the ears to the right side of the machine. Pivotally connected to the machine frame and aligned with the cross conveyor 46 is an elevator conveyor 50. In a harvesting operation, the elevator conveyor 50 transfers the ears into a truck or wagon moved along with the harvesting machine.

With more detailed reference to the structure of the picking heads P1 and P2 of the present invention, the two units include similar parts with minor and obvious differences in orientation. For this reason, only the picking head P1 will be described in detail.

The picking head P1 is provided with a fabricated frame 52 (FIG. 5) which includes an elongate base member 54 of inverted channel shape with an apertured top wall 56. Mounted under the wall 56 is a hydraulic motor 58 that is coupled by a chain and sprocket drive connection 60 to the input shaft of a gearbox 62. Two output shafts are provided on the gearbox; a horizontal shaft 64 which drives an overhead stalk ejector mechanism 66 by means including a chain and sprocket drive 67, and an upright shaft 68 which carries a sprocket 69.

The sprocket 69 directly powers a pair of endless gathering belts 70 and 71 (FIG. 6) and indirectly drives a pair of endless butt stop flights 72 and 73. Thus, the gathering belt 70 is mounted on a pair of drive sprockets 74 (FIG. 5) keyed to a shaft 76, and on a pair of idler sprockets 78 keyed to a shaft 80. The butt stop flight 72 is mounted on an idler sprocket 77 and on a drive sprocket 79. The sprocket 79 is mounted on the shaft 80 and the idler sprocket 77 is mounted atop the picking head frame 52. Similarly numbered parts with the suffix *a* drive and support the gathering belt 71 and the butt stop flight 73.

Figure 5:
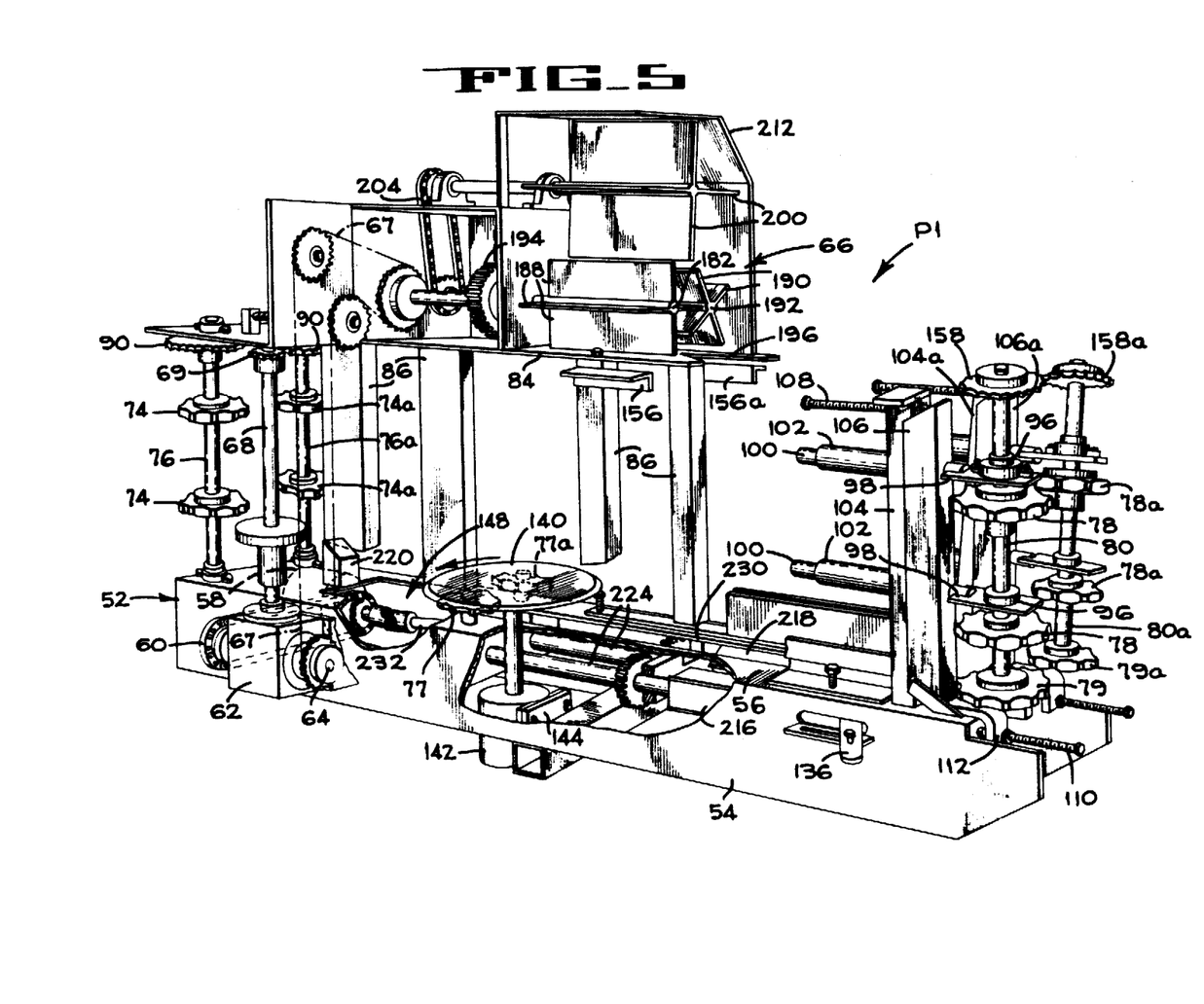
FIG. 5 is an enlarged perspective of the frame of one of the two picking heads on the leading end of the machine.

With continued reference to FIG. 5, the driveshafts 76 and 76*a* extend upward through an elongate stripper plate 84 which extends forwardly beyond the stalk ejector 66 and is supported by posts 86 from the top wall 56 of the base 54. A chain 88 (FIG. 6) is trained around the drive sprocket 69 and around aligned sprockets 90 on the gathering belt shafts 76 and 76*a* in a manner which rotates the drive sprockets for the gathering belts 70 and 71 in opposite directions so that their confronting flights move rearward.

Idler shaft 80 for the gathering belt 70 (FIG. 5) is mounted in bearings 96. Each bearing is supported by a mounting plate 98 that is welded to a rod 100. The rod 100 is slidably mounted in a tube 102 that extends through and is welded to a square, inclined post 104. Nested over the front of the post 104 is a floating channel 106 having apertures aligned with the tubes 102, and arranged to be positioned in preselected nested relation to the post by bolts 108 and 110. Bolt 108 is threaded through the post 104 and bears against the inner surface of the channel 106.

The lower end portion of the channel 106 carries a forwardly and downwardly extending bracket 112, through which the bolt 110 is threaded into endwise abutment with the frame 52. Thus, the channel 106 can be adjustably positioned relative to the post 104, and contacts the mounting plates 98 in order to supply the correct tension to the gathering belt 70. The shaft 80*a* is provided with a similar belt-tensioning mechanism.

Figures 6, 6A:
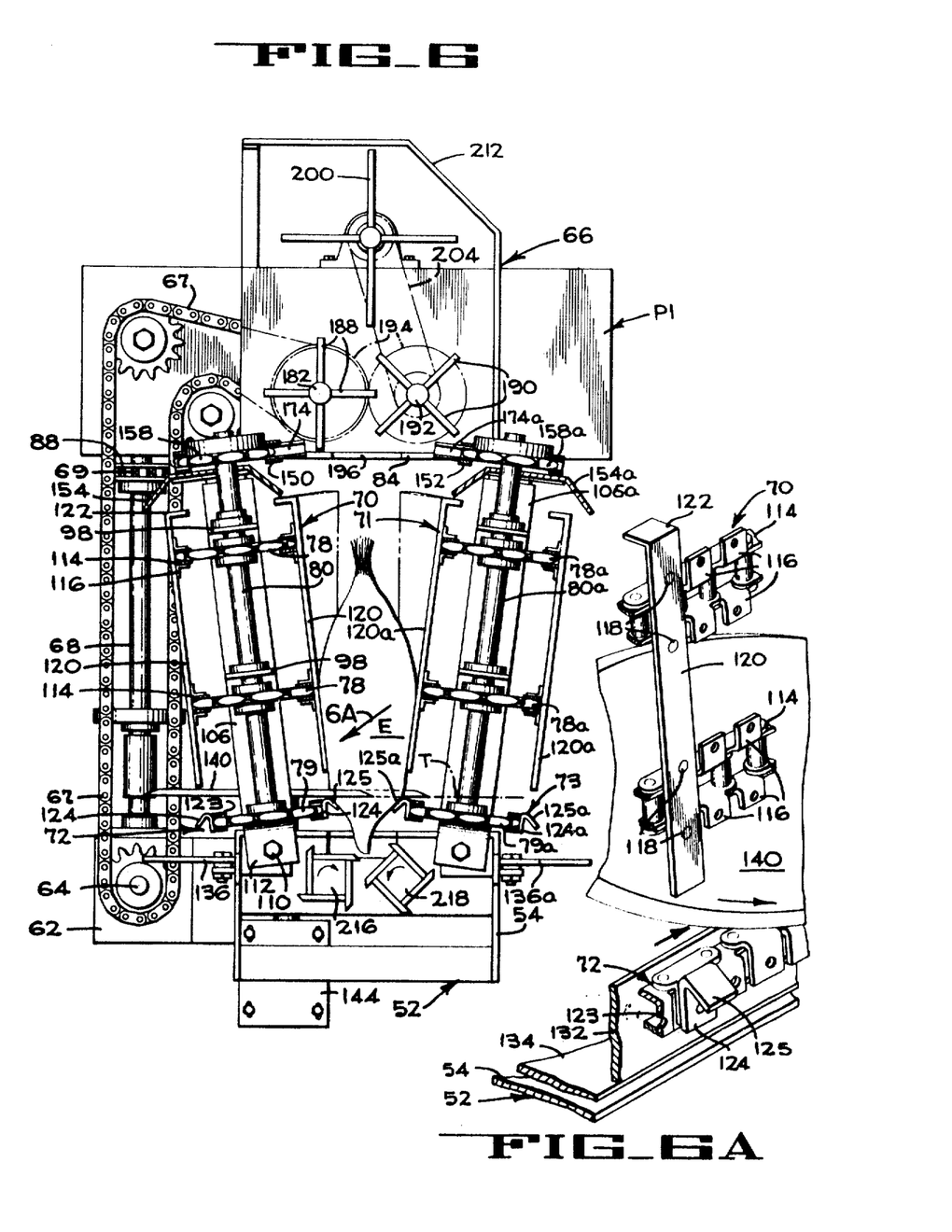
FIG. 6 is a front elevation of the apparatus shown in FIG. 5, partially in section, with the addition of certain belt flights that support and convey the harvested ears.
FIG. 6A is an enlarged fragmentary perspective of an endless belt flight indicated by the general arrow 6A on FIG. 6.

The gathering or gripper belt 70 (FIG. 6) includes two endless chains 114 trained around the pairs of sprockets 74 and 78. As best shown in FIG. 6A, each link of the chains is provided with apertured attachment tabs 116, four such tabs being coplanar, aligned and held with rivets 118 to a metal slat 120. The upper end portion of each flight of slats is, in effect, provided with a blunt edge formed of inwardly directed flanges 122. The lower end portion of each slat 120 is spaced above a short slat segment 124 which is similarly mounted on an endless chain 123, and which is bent to provide an outwardly declining ledge 125. The gathering belt and butt stop slats 120 and 124 are laterally aligned with similar gathering belt and butt stop slats 120*a* and 124*a* at the other side of the picking head.

The result of this construction is that the gathering belt slats 120 and 120*a*, and the ledges 125 and 125*a* of the butt stop slats 124 and 124*a* cooperatively form horizontally separated gripping, supporting and conveying means for the ears of corn. Thus, the gap between the confronting ledges 125 and 125*a* is less than the diameter of the smallest ear to be harvested, and as fully described in the above identified Looker application, the gap can be adjusted, before the harvesting machine is placed in operation, by positioning a lever 136 and a lever 136*a*.

It should be noted here that the confronting reaches of the gathering belts 70 and 71 and of the moving butt stops 72 and 73 are controlled to move rearward at a linear speed slightly faster than the ground speed of the machine so as to keep the inlet end of the picking head clear, and yet minimize relative horizontal motion between the ears and the gathering belt and butt stop slats. FIG. 6*a* illustrates the manner in which the inner reach of the butt stop flight 72 is laterally restrained to preserve the width of the gap between the butt stop flights. For this purpose, the butt stop chain 123 slides along the outer face of an upright wear plate 132. The wear plate is mounted on a base plate 134 that is movable toward and away from the center of the picking head by adjusting the lever 136. The lever 136*a* functions in a like manner for positioning the butt stop flight 73.

Referring again to FIG. 6 and to the specific subject matter of the present invention, it will be seen that the ear E is verically supported by the ledges 125 and 125*a* of the moving butt stop slats 124 and 124*a*, and laterally gripped, above the butt stop slats, by the gathering or gripper belt slats 120 and 120*a*. The vertical space between the butt stop and gripper slats at each side of the center of the picking head is coincident with a lateral plane which intersects the interposed ear E.

This plane, indicated by the reference line T, is at a distance above the butt end of the ear which approximates the upper limit of the normal trimmed waste, and the lower limit of the edible part of the ear. In order to trim the ears in this manner, i.e., to discard the waste butt end of the ear from the portion suitable for table use, a powered rotary knife disc 140 is provided with a radial segment extending across the reference or cutting plane T. A hydraulic motor 142 (FIG. 5) powers the knife disc and is mounted on a frame bracket 144 (FIGS. 5 and 6) which has slotted bolt holes to provide vertical positioning adjustment of the knife blade. It will be seen that the knife blade 140 is mounted well behind the inlet end of the picking head frame 52 to assure that the ears have ample time to be oriented and firmly gripped before their butt ends are trimmed.

The knife blade 140 should preferably revolve in the direction of the arrow shown thereon in FIG. 5 so that the cutting segment of the blade moves in the same rearward direction as the ears. This assists in moving the trimmed butt portion of the ear toward a downwardly open portion at 148 (FIG. 5) of the picking head frame 52 that provides a clear path to eject the trimmed waste onto the ground.

The following description is directed to the remainder of the picking head structure, which is substantially the same as disclosed in the aforementioned Looker application.

The leading ends of the gathering belts 70 and 72 (FIGS. 2 and 6) are provided with conventional gathering chains 150 and 152, respectively. The gathering chain 150 is supported by a cantilever arm 154 that is secured to tabs 156 (FIG. 5) of the frame 52, and extends forward of the gathering chain idler shaft 80. Chain 150 derives its power by means including a sprocket 158 on the idler shaft 80, and is trained around an idler sprocket at 160 (FIG. 2).

Intermediate the sprockets 158 and 160, the rearwardly moving inner reach of the gathering chain slides over a laterally adjustable guide block 170 which is so positioned on the arm 154 as to keep the inner portion of the chain reach substantially parallel to the centerline of the picking head. The placement of the guide block, and the size and location of the idler sprocket 160 makes the outer portion of the chain reach diagonal relative to the path of the cornstalks between the gathering chains 150 and 152, whereby the two chains provide an outwardly diverging entrance throat for guiding the stalks into the machine. Triangular panels 172 and 172a forward of the gathering belts 70 and 72 provide smooth walls defining the entrance throat and lie inward of pusher lugs 174, 174a that are mounted on the gathering chains to drive the stalks rearward.

The stalk ejector 66 (FIGS. 5 and 6) includes two interdigitating assemblies of paddle blades, four blades 18 on a driven shaft 182, and another four blades 190 on a shaft 192. Gears 194 on the two paddle shafts maintain synchronous movement of the paddle blades.

The stripper plate 84 which underlies the ejector paddles is provided with a forwardly open central slot 196 that flares outward at its leading end to guide cornstalks between the paddles 188 and 190 if a stalk should break off in the picking unit so that it cannot be harvested in the normal manner. In this event, the stalk is gripped by the stalk ejector paddles and driven upwardly out of the machine.

During ejection of the stalk, the ears are arrested by the stripper plate 84 and are thus separated from the stalk. In order to divert the harvested stalks laterally during ejection, a driven deflector paddle 200 is mounted above the stalk ejector paddles. The deflector paddle 200 includes a chain and sprocket drive connection 204 to the paddle shaft 192. In cooperation with a sheet metal hood 212 that is open toward the side of the harvesting machine, the deflector paddle 200 forces the broken stalks which are fed upward through the stalk ejector 66, laterally onto the ground.

The normal harvesting of ears from unbroken stalks is accomplished by means including conventional counter-rotating knife blade rotors 216 and 218 (FIGS. 5 and 6). The rotors are driven by shafts 224, one of which is coupled by a shaft 232 to the hydraulic motor 58. Above the rotors, the wall 56 of the base member 52 is provided with a forwardly open slot 230 to provide a clearance passage for the cornstalks. The slot extends rearward to a point behind the butt trimming knife disc 140 to allow clearance for the short stalk section attached to the butt end of the ear. The slot 230 is wider than the widest adjusted gap between the butt stop ledges 125 and 125a so that husks, leaves and other waste foliage have clear passage into the knife blade rotors for immediate removal from the picking head.

Figure 7:
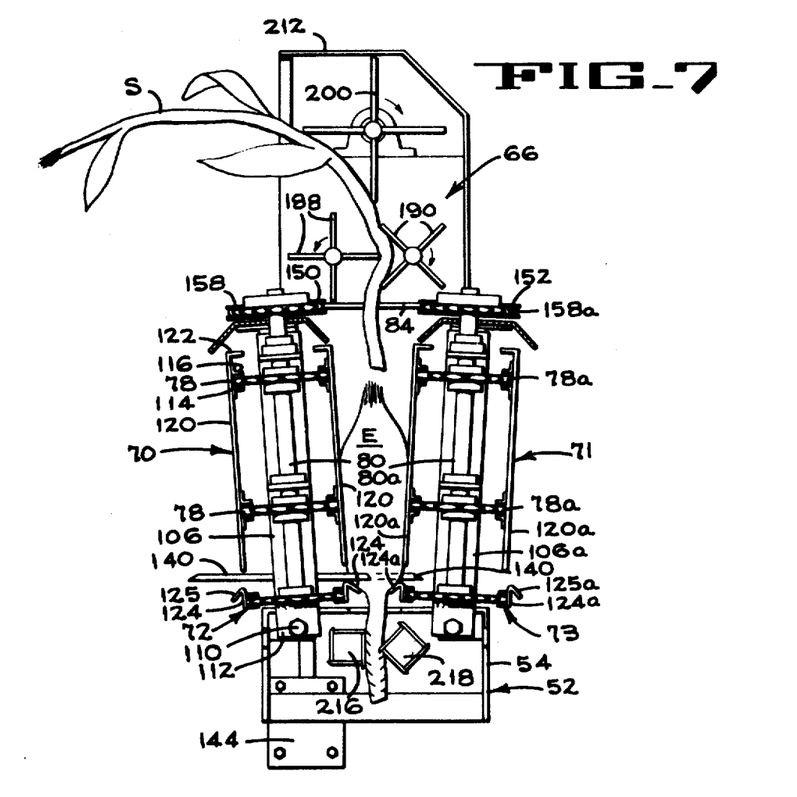
FIG. 7 is a partially sectioned front elevation similar to FIG. 6, and illustrates another aspect of the harvesting operation.

Rotors 216 and 218 (FIGS. 6-8) straddle the cornstalk S as the harvesting machine is moved along the row, and chop into the stalk to positively and rapidly drive it downward. As an ear attached to a stalk is pulled down between the gathering belt slats 120 and 120a, the butt end is first gripped by the slats because the slats diverge upward as shown in FIG. 7. Meanwhile, the action of the rotors on the stalk tends to draw the stalk into a position normal to the rotors. In this manner, the upright stalk S1 in FIG. 8 will assume the general position of the stalk S2, and the ear E is approximately perpendicular to the axes of the rotors.

After the ear E (FIG. 7) is seated on the ledges 125 and 125a of the butt stop flights 72 and 73, the stalk attachment to the ear is severed by the rotors 216 and 218 and the ear continues to be moved rearward by the butt stop flights and the gathering belt flights 70 and 71. The ear is thus perpendicular to the cutting plane of the knife blade 140, and the cutting plane intersects the ear at the approximate point where only the marketable portion of the ear is located above the knife blade. Thus, the knife blade severs the waste butt end portion W of the ear, and because the active segment of the blade moves rearward, the trimmed waste W is carried rearward the drop through the open section at 148 of the picking head frame onto the ground.

The trimmed ears, rearward of the knife blade 140 (FIG. 8) strike a fixed abutment 220 (shown also in FIG. 5) that is arranged to momentarily arrest the trimmed end. This causes each ear to be tipped rearward, to disengage the abutment, and to travel from the abutment tassle end first in order to facilitate further handling by giving the ears a common orientation.

If the stalk breaks or is severed by the rotors so that a free upper end portion which may have an unharvested ear is left in the machine, the broken stalk portion is carried rearward by the gathering belts and the stalk is guided by the stripper plate 84 into the stalk ejector 66. The counterrotating paddle blades 188 and 190 (FIG. 12) thus engage the stalk and force it upward into the stalk deflector 200 so that the stalk is ejected toward the side of the machine. Meanwhile, the ear is arrested by the stripper plate 84 so that the ear and stalk are separated. The severed ear falls back between, and is conveyed rearward, by the gathering belts. The normal stalk pulling action is the usual operating mode as long as the stalk does not break above the rotors.

From the preceding description it is believed to be clear that the butt stop flights, gathering belt flights, and the powered butt trimming blade which operates in the elongate spaces between the confronting pairs of flights, cooperatively produce new and useful results, the foremost of which are (1) The picking head can harvest green corn, for table use, by virtue of the gentle handling afforded by the harvesting mechanism, (2) The harvested ears are subject to minimal handling because the waste butt ends of the ears are removed in the stalk and ear separation operation and (3) All waste, except the husks, is discarded in the field to eliminate waste disposal problems and cost.

Although the best mode contemplated for carrying out the present invention has been herein shown and described, it will be apparent that modification and variation may be made without departing from what is regarded to be the subject matter of the invention.

What is claimed is:

1. In a corn picking head including a frame; conveying means on said frame for supporting the ears in their upright growing positions as the picking head advances along a row of cornstalks; snapper means mounted under said conveying means for gripping a cornstalk and pulling the stalk downward with the ears attached; and butt supporting means above said snapper means for arresting downward motion of the upright ears while the attachments of the ears to the stalks are severed by said snapper means; the improvement comprising a power driven knife mounted on said frame between said butt supporting means and said conveying means, the cutting edge of said knife being arranged to sever the waste butt end of each ear which is moved past said knife as the picking head is moved along the row of cornstalks.

2. A corn picking head comprising a frame arranged for movement along a row of growing cornstalks, means mounted on said frame for harvesting ears and positioning the ears butt end down for rearward movement relative to the picking head with the waste portion of each butt end lying below a given plane, and a knife blade mounted on said frame to produce a cutting operation coincident with said plane, each ear moved rearward past the knife thus comprising only the unhusked marketable portion of the ear.

3. Apparatus according to claim 2 and a fixed abutment elevationaly positioned downstream of said knife blade to intercept the lower portion of the trimmed ear, said gathering conveyor thus advancing the tassle end of the ear while the trimmed end of the ear is temporarily arrested, the ears being thereby tilted to exit the machine tassle end first.

4. In a mobile corn harvesting machine including a picking head having a frame which carries moving gathering conveyor flights arranged to grip and convey ears rearwardly in the picking head, and rotors below said gathering conveyor for gripping a cornstalk and pulling the stalk downward, the improvement comprising laterally opposed, rearwardly moving butt stop flights positioned between said rotors and said gathering conveyor flights for supporting the butt ends of the ears while the ears are conveyed rearwardly into the harvesting machine, and a powered knife extending across the path of the ears between said butt stops and said gathering conveyor for severing the butt ends of the ears moved past said knife.

5. Apparatus according to claim 4 wherein said knife is an edge-sharpened disc rotatable about an upright axis.

6. Apparatus according to claim 4 and abutment means mounted in fixed position adjacent said knife for temporarily arresting one end of each trimmed ear moved past the knife, the ears thus being conveyed beyond said arresting means with a common orientation.

7. Apparatus according to claim 6 wherein said gathering conveyor includes two interspaced confronting parallel flights, said butt stop flights being individually subposed beneath said gathering conveyor flights, and common drive means for each adjacent pair of gathering conveyor and butt stop flights, the pairs of flights being driven synchronously at the same speed to prevent relative motion between the ears and flights other than the relative motion occurring when the ears are tilted by said abutment means.

8. In a mobile corn harvesting machine including a picking head having a frame which carries a rearwardly moving gathering conveyor, snapper means beneath said conveyor for gripping a cornstalk and pulling the stalk downward, and ear abutment means above said snapper means for arresting downward movement of an ear while the attachment of the ear to the stalk is being severed; said ear abutment means including laterally opposed, rearwardly moving butt stops cooperatively defining a straight, elongate slot for longitudinally admitting the cornstalk and leaves, said butt stops lying below a severance plane which defines the waste butt end and the marketable portion of the ear, said slot also accommodating downward passage of leaves and severed cornstalks as the ears are removed, means for moving said butt stops rearward at a horizontal linear speed approximating the ground speed of the harvesting machine, and a power driven knife mounted on said frame with its cutting edge located to sever each ear along the severance plane.

9. A corn picking head comprising a frame arranged for movement along a row of growing cornstalks, means mounted on said frame for harvesting ears from their stalks, means for holding and moving the harvested ears rearwardly relative to the frame, and knife means mounted on said frame for trimming the butts from the ears while they are thus held and moving.

10. A corn picking head comprising a frame arranged for movement along a row of cornstalks, means mounted on said frame for harvesting ears from their stalks and for holding and moving the harvested ears rearwardly relative to the frame, and means disposed in the path of the rearwardly moving harvested ears for engaging and aligning the ears in substantially end-to-end disposition for a subsequent husking operation.

11. The picking head of claim 10, wherein said aligning means comprises abutment means on said frame disposed in the path of the rearwardly moving ears.

12. A method of machine harvesting corn including the steps of simultaneously gripping the ears while attached to their stalks and removing the ears thus gripped from their stalks as the harvester advances relative to the stalks as the ears move rearwardly relative to the harvester; the improvement comprising the steps of maintaining the grip on rearwardly moving ears after their removal while aligning the ears in substantially end-to-end disposition for a subsequent husking operation.

13. A method of machine harvesting corn including the steps of simultaneously gripping the ears while attached to their stalks and removing the ears thus gripped from their stalks as the harvester advances relative to the stalks and the ears are moved rearwardly relative to the harvester; the improvement comprising the steps of maintaining the grip on the rearwardly moving ears and severing the butts from the moving ears while thus gripped.

References Cited

UNITED STATES PATENTS

| 801,258 | 10/1905 | Morral et al. | 146—84 |
|---|---|---|---|
| 1,528,635 | 3/1925 | Ronning et al. | 56—14.2 |
| 3,492,797 | 2/1970 | Sears | 56—107 |
| 3,499,272 | 3/1970 | Looker | 56—14.2 |
| 3,535,857 | 10/1970 | Looker | 56—14.2 |

RUSSELL R. KINSEY, Primary Examiner

U.S. Cl. X.R.

56—104; 146—84; 171—611

PO-1050
(5/69)

UNITED STATES PATENT OFFICE
CERTIFICATE OF CORRECTION

Patent No. 3,606,743            Dated SEPTEMBER 21, 1971

Inventor(s) R. A. JOHNSON

It is certified that error appears in the above-identified patent and that said Letters Patent are hereby corrected as shown below:

Column 5, line 35: delete "18" and insert --188--.

Column 6, line 20: delete "the" (second occurrence) and insert --to--.

Column 7, line 14: delete "elevationaly" and insert --elevationally--.

Signed and sealed this 13th day of June 1972.

(SEAL)
Attest:

EDWARD M. FLETCHER, JR.            ROBERT GOTTSCHALK
Attesting Officer            Commissioner of Patents